United States Patent
Chen et al.

(10) Patent No.: US 11,129,234 B2
(45) Date of Patent: Sep. 21, 2021

(54) METHODS FOR PACKET DATA CONVERGENCE PROTOCOL (PDCP) DUPLICATION OPERATIONS AND DEVICES USING THE SAME

(71) Applicant: FG Innovation Company Limited, Tuen Mun (CN)

(72) Inventors: Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 116 days.

(21) Appl. No.: 16/274,258

(22) Filed: Feb. 13, 2019

(65) Prior Publication Data
US 2019/0254117 A1    Aug. 15, 2019

Related U.S. Application Data

(60) Provisional application No. 62/629,778, filed on Feb. 13, 2018.

(51) Int. Cl.
| | |
|---|---|
| *H04W 80/08* | (2009.01) |
| *H04W 80/02* | (2009.01) |
| *H04W 76/15* | (2018.01) |
| *H04W 28/06* | (2009.01) |
| *H04L 12/801* | (2013.01) |
| *H04L 5/00* | (2006.01) |

(52) U.S. Cl.
CPC .......... *H04W 80/08* (2013.01); *H04L 5/0098* (2013.01); *H04L 47/34* (2013.01); *H04W 28/06* (2013.01); *H04W 76/15* (2018.02); *H04W 80/02* (2013.01)

(58) Field of Classification Search
CPC ..... H04W 80/08; H04W 80/02; H04W 76/15; H04W 28/06; H04L 47/34; H04L 5/0098; H04L 1/08; H04L 5/001
See application file for complete search history.

(56) References Cited

U.S. PATENT DOCUMENTS

2012/0281564 A1* 11/2012 Zhang ................ H04L 1/08
370/252
2018/0324642 A1* 11/2018 Yu ........................ H04L 1/22

FOREIGN PATENT DOCUMENTS

| CN | 107342851 A | 11/2017 |
|---|---|---|
| WO | 2006073100 A | 7/2006 |
| WO | 2008140028 A | 11/2008 |
| WO | 2010131850 A | 11/2010 |

\* cited by examiner

*Primary Examiner* — Walter J Divito
(74) *Attorney, Agent, or Firm* — ScienBiziP, P.C.

(57) ABSTRACT

A method for wireless communications is provided. The method includes receiving, by a communication device, duplication assistance information from a network, wherein the communication device is configured with a first Radio Link Control (RLC) entity and a second RLC entity; duplicating, by the communication device, a first PDCP Protocol Data Unit (PDU) to create a second PDCP PDU that is a copy of the first PDCP PDU; submitting, by the communication device, the first PDCP PDU and the second PDCP PDU to the first RLC entity and the second RLC entity, respectively; and discarding, by the communication device, the second PDCP PDU in a buffer of the second RLC entity based on the duplication assistance information.

18 Claims, 7 Drawing Sheets

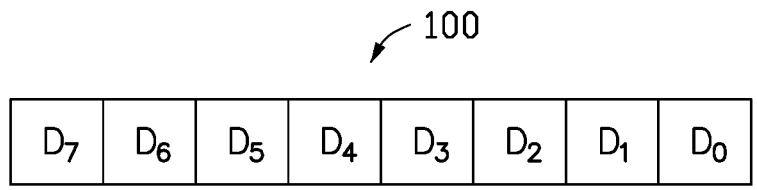
FIG. 1
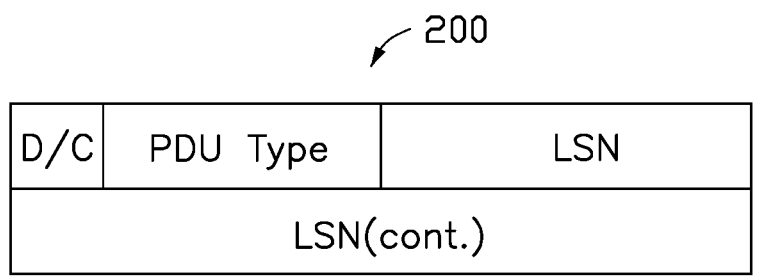
FIG. 2
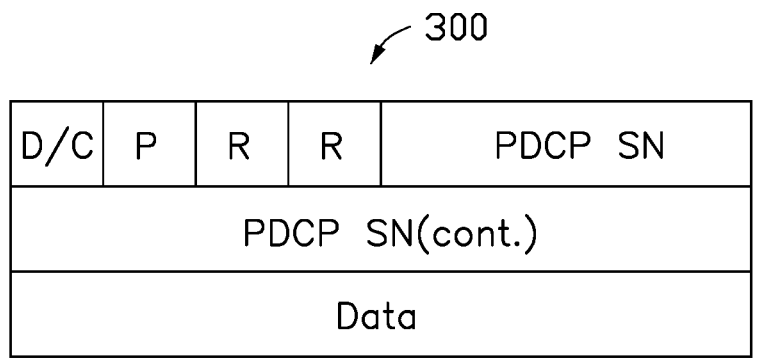
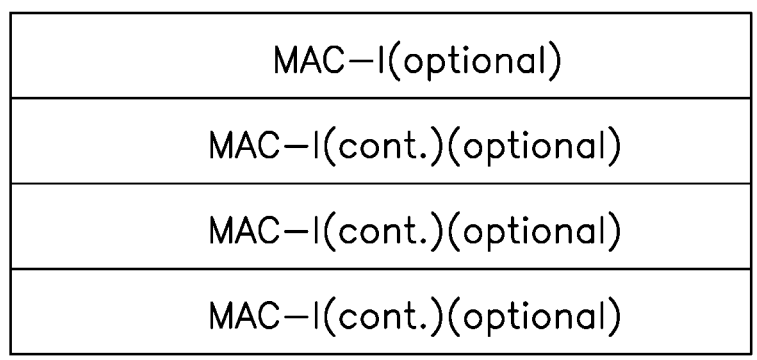
FIG. 3

400

| $S_7$ | $S_6$ | $S_5$ | $S_4$ | $S_3$ | $S_2$ | $S_1$ | $S_0$ |
|---|---|---|---|---|---|---|---|
| $F_7$ | $F_6$ | $F_5$ | $F_4$ | $F_3$ | $F_2$ | $F_1$ | $F_0$ |
| LSN of $D_3$ ||||||||
| LSN(cont.) of $D_3$ |||| LSN of $D_4$ ||||
| LSN(cont.) of $D_4$ ||||||||
| LSN(cont.) of $D_4$ |||||| LSN of $D_5$ ||
| LSN(cont.) of $D_5$ ||||||||
| LSN(cont.) of $D_5$ ||||||||

| $S_7$ | $S_6$ | $S_5$ | $S_4$ | $S_3$ | $S_2$ | $S_1$ | $S_0$ |
|---|---|---|---|---|---|---|---|
| $F_7$ | $F_6$ | $F_5$ | $F_4$ | $F_3$ | $F_2$ | $F_1$ | $F_0$ |
| R | R | LSN of $D_3$ ||||||
| LSN(cont.) of $D_3$ |||||| LSN of $D_5$ ||
| LSN(cont.) of $D_5$ ||||||||
| LSN(cont.) of $D_5$ ||||||||

| D/C | PDU Type | R | R | SNGI |
|---|---|---|---|---|
| SNGI(cont.) ||||||

| D/C | PDU Type | P/N | R | R | R |
|---|---|---|---|---|---|
| SNGI ||||||

| D/C | PDU Type | P/N | R | R | R |
|---|---|---|---|---|---|
| R | R | R | R | SNG(cont.) |||
| SNG(cont.) |||||||

FIG. 12

```
                        ┌─ 1300
┌───┬──────────┬───┬───┬──────┐
│D/C│ PDU Type │P/N│ R │ SNG  │
├───┴──────────┴───┴───┴──────┤
│        SNG(cont.)           │
├─────────────────────────────┤
│        SNG(cont.)           │
└─────────────────────────────┘
```

FIG. 13

```
                    ┌─ 1400
┌───┬──────────┬─────────┐
│D/C│ PDU Type │   DTI   │
└───┴──────────┴─────────┘
```

FIG. 14

```
                    ┌─ 1500
┌───┬──────────┬───┬─────────┐
│D/C│ PDU Type │P/S│   DTI   │
└───┴──────────┴───┴─────────┘
```

FIG. 15

METHODS FOR PACKET DATA CONVERGENCE PROTOCOL (PDCP) DUPLICATION OPERATIONS AND DEVICES USING THE SAME

CROSS-REFERENCE TO RELATED APPLICATION(S)

The present application claims the benefit of and priority to a provisional U.S. Patent Application Ser. No. 62/629,778 filed on Feb. 13, 2018, entitled "PDCP Packet Duplication Mechanism," (hereinafter referred to as "US73167 application"). The disclosure of the US73167 application is hereby incorporated fully by reference into the present application.

FIELD

The present disclosure generally relates to wireless communications, and more particularly, to methods for Packet Data Convergence Protocol (PDCP) duplication operations and devices using the same.

BACKGROUND

Various efforts have been made to improve the performances of wireless communications, such as improving data rate, latency, reliability and mobility, for the next generation (e.g., 5G New Radio (NR)) wireless communication systems. Among these efforts, the next generation wireless communication systems introduce a function of PDCP duplication to achieve higher reliability on data transmission.

With the PDCP duplication, a transmitting device may increase the probability that the corresponding receiving device successfully receives the data. However, the details on how to perform the PDCP duplication operation have not been extensively discussed. Thus, improvements are needed in the art.

SUMMARY

The present disclosure is directed to methods for PDCP duplication operations and devices using the same.

According to an aspect of the present disclosure, a method for wireless communications is provided. The method includes receiving, by a communication device, duplication assistance information from a network, wherein the communication device is configured with a plurality of Radio Link Control (RLC) entities including a first RLC entity and a second RLC entity; duplicating, by the communication device, a first PDCP Protocol Data Unit (PDU) to create a second PDCP PDU that is a copy of the first PDCP PDU; submitting, by the communication device, the first PDCP PDU and the second PDCP PDU to the first RLC entity and the second RLC entity, respectively; and discarding, by the communication device, the second PDCP PDU in a buffer of the second RLC entity based on the duplication assistance information.

According to another aspect of the present disclosure, a communication device configured with a plurality of RLC entities including a first RLC entity and a second RLC entity is provided. The communication device includes one or more non-transitory computer-readable media having computer-executable instructions embodied thereon and at least one processor coupled to the one or more non-transitory computer-readable media. The at least one processor is configured to execute the computer-executable instructions to receive duplication assistance information from a network; duplicate a first PDCP PDU to create a second PDCP PDU that is a copy of the first PDCP PDU; submit the first PDCP PDU and the second PDCP PDU to the first RLC entity and the second RLC entity, respectively; and discard the second PDCP PDU in a buffer of the second RLC entity based on the duplication assistance information.

BRIEF DESCRIPTION OF THE DRAWINGS

Aspects of the exemplary disclosure are best understood from the following detailed description when read with the accompanying figures. Various features are not drawn to scale.

Dimensions of various features may be arbitrarily increased or reduced for clarity of discussion.

FIG. 1 shows a schematic diagram illustrating a Duplication Activation/Deactivation MAC CE, in accordance with an example implementation of the present disclosure.

FIG. 2 shows a schematic diagram illustrating a PDCP Control PDU, in accordance with an example implementation of the present disclosure.

FIG. 3 shows a schematic diagram illustrating a PDCP Data PDU, in accordance with an example implementation of the present disclosure.

FIG. 4 shows a schematic diagram illustrating a Duplication Status Report MAC CE, in accordance with an example implementation of the present disclosure.

FIG. 5 shows a schematic diagram illustrating a Duplication Status Report MAC CE, in accordance with an example implementation of the present disclosure.

FIG. 10 shows a schematic diagram illustrating a PDCP Control PDU, in accordance with an example implementation of the present disclosure.

FIG. 11 shows a schematic diagram illustrating a PDCP Control PDU, in accordance with an example implementation of the present disclosure.

FIG. 12 shows a schematic diagram illustrating a PDCP Control PDU, in accordance with an example implementation of the present disclosure.

FIG. 13 shows a schematic diagram illustrating a PDCP Control PDU, in accordance with an example implementation of the present disclosure.

FIG. 14 shows a schematic diagram illustrating a PDCP Control PDU, in accordance with an example implementation of the present disclosure.

FIG. 15 shows a schematic diagram illustrating a PDCP Control PDU, in accordance with an example implementation of the present disclosure.

DETAILED DESCRIPTION

Figure 6:
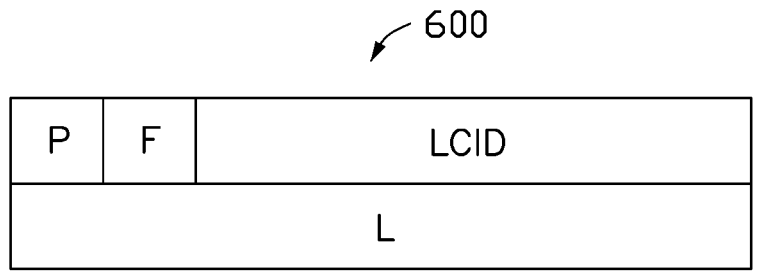
FIG. 6 shows a schematic diagram illustrating a MAC subheader with polling, in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), or an interne), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA base station in connection with the 5GC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell)

provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells. In MR-DC cases, the primary cell of an MCG or an SCG may be called as SpCell. PCell may refer to the SpCell of an MCG. PSCell may refer to the SpCell of an SCG. MCG means a group of serving cells associated with the master node, comprising of the SpCell and optionally one or more secondary cells (SCells). SCG means a group of serving cells associated with the secondary node, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

New Radio (NR) has introduced the concept of PDCP duplication to support the high reliability requirement of certain services.

When PDCP duplication is configured for a radio bearer by Radio Resource Control (RRC) signaling, at least one additional RLC entity and at least one additional logical channel may be added to the radio bearer to handle the duplicated PDCP PDUs. The PDCP duplication operation at the PDCP entity therefore includes sending the same PDCP PDU(s) multiple times. For example, if twice, the PDCP operation may include sending a PDCP PDU once to the original RLC entity and sending the same PDCP PDU a second time to the additional RLC entity. With at least two independent transmission paths, the PDCP duplication may increase the reliability and reduces the latency which makes the PDCP duplication concept beneficial for various services, such as Ultra Reliable Low Latency Communications (URLLC) services. In the following, the PDCP duplication operation for the case of two RLC entities (e.g., the UE is configured with two RLC entities) is introduced for brevity, but it should be noted that implementations of the present disclosure may be also applicable for the more than two RLC entities cases (e.g., the UE is configured with more than two RLC entities).

During the PDCP duplication operation, the original PDCP PDU and the corresponding duplicate may not be transmitted on the same carrier. The two different logical channels may either belong to the same Medium Access Control (MAC) entity (e.g., in a Carrier Aggregation (CA) case) or to different MAC entities (e.g., in a Dual Connectivity (DC) architecture). In the former case, one or more logical channel mapping restrictions may be used in the MAC entity to ensure that the logical channel carrying the original PDCP PDUs and the logical channel carrying the corresponding duplicate are not sent on the same carrier. For the Signaling Radio Bearers (SRBs), the PDCP duplication may be solely controlled by RRC signaling. For the Data Radio Bearers (DRBs), once configured, the PDCP duplication may be activated or deactivated per DRB by means of a MAC Control Element (CE).

The Network (NW) may control the function of PDCP duplication for Uplink (UL) transmissions through the duplication control information. For example, one or more DRBs may be configured with the PDCP duplication function, and the PDCP duplication function of the respective DRBs may be activated or deactivated by the duplication control information. In one implementation, the duplication control information may be included in a MAC CE (e.g., a Duplication Activation/Deactivation MAC CE). In one implementation, the duplication control information may be indicated by RRC signaling (e.g., the initial state of the duplication function is set to activated or deactivated).

For example, when a Duplication Activation/Deactivation MAC CE that indicates activation of the PDCP duplication function for a specific DRB is received, the MAC entity may indicate such activation of the PDCP duplication function to the upper layers (e.g., the RLC and/or PDCP layer). On the other hand, when a Duplication Activation/Deactivation MAC CE that indicates deactivation of the PDCP duplication function for a specific DRB is received, the MAC entity may indicate such deactivation of the PDCP duplication function to the upper layer(s).

As described above, the NW may configure a split bearer (e.g., a master node-terminated split bearer or a secondary node-terminated split bearer) with the PDCP duplication function for a UE. Once the PDCP duplication function is configured for the split bearer, the NW may further send the duplication control information to control the PDCP duplication function status (e.g., the activation state or the deactivation state) for the split bearer. Upon receiving the Duplication Activation/Deactivation MAC CE, the UE may know that the PDCP duplication function for the split bearer (or the associated PDCP entity) is to be activated/deactivated.

For an E-UTRA-NR Dual Connectivity (EN-DC) case, in some of the present implementations, the secondary node (e.g., a gNB) may send the duplication control information (e.g., via a Duplication Activation/Deactivation MAC CE) to the UE to control the PDCP duplication function status of a DRB for the PDCP entity located in the master node. However, in some such implementations, the PDCP entity at the master node may not know whether the PDCP duplication function for the DRB is activated or not, unless the secondary node informs the master node, e.g., through the backhaul connection. Thus, if there are no optimizations or additional interactions between the NW nodes (e.g., the master node and the secondary node), the PDCP entity at the master node may encounter excessive reordering delay for the PDCP PDUs.

In accordance with some implementations of the present disclosure, the UE may transmit a duplication status report to the NW in response to a change in the PDCP duplication function status of at least one radio bearer. For example, once the UE receives (from one NW node) the duplication control information (which is configured to switch the PDCP duplication function status of at least one radio bearer), the UE may send a duplication status report to the related NW node, so that the related NW nodes associated with the PDCP duplication transmission may know the current PDCP duplication function status for the at least one radio bearer (e.g., DRB/SRB). In some implementations, the UE may report the duplication status report to the NW (e.g., including one or more of the NW nodes associated with the PDCP duplication transmission) in response to the duplication control information received from the NW. For example, once the UE receives the duplication control information from the master node (or from the secondary node), the UE may report the duplication status report to the master node and/or the secondary node.

In one implementation, the duplication status report may include at least one of the following items: 1) at least one duplication status indicator associated with the at least one radio bearer; and 2) at least one Last Sequence Number (LSN) indicating a PDCP SN of the last PDCP PDU of the at least one radio bearer before the PDCP duplication function status of the at least one radio bearer is changed in response to the duplication control information.

The duplication status indicator(s) may be used to indicate the PDCP duplication function status of which the radio bearer is changed by the duplication control information. The LSN may be used to indicate when the PDCP duplication function status of the radio bearer (e.g., affected by the duplication control information) is changed. For example, in some of the present implementations, the LSN may be a PDCP SN of the last duplicated PDCP PDU for a DRB if the PDCP duplication function for the DRB is deactivated by the duplication control information, or may be a PDCP SN of the last PDCP PDU, which has not been duplicated, for the DRB if the PDCP duplication function is activated by the duplication control information.

In accordance with some implementations of the present disclosure, the Duplication Activation/Deactivation MAC CE, which includes the duplication control information, may have various formats. For better understanding, an example format of the Duplication Activation/Deactivation MAC CE containing the duplication control information is illustrated with reference to FIG. 1.

Duplication Activation/Deactivation MAC CE Format

FIG. 1 shows a schematic diagram illustrating a Duplication Activation/Deactivation MAC CE, in accordance with an example implementation of the present disclosure.

As show in FIG. 1, the Duplication Activation/Deactivation MAC CE 100 may be identified by a MAC PDU subheader with a Logical Channel ID (LCID). The Duplication Activation/Deactivation MAC CE 100 may have a fixed size and may consist of a single octet containing eight D-fields (e.g., $D_i$, where i=0, 1, 2, . . . , 7) in some of the present implementations.

Each D-field (e.g., each of $D_0$ to $D_7$) may be configured to indicate the PDCP duplication function status of the corresponding radio bearer (e.g., DRB i (or SRB i), where i is the ascending/descending order of the DRB ID (or SRB ID) among the DRBs (or SRBs) configured with the PDCP duplication function and with the RLC entity(ies) associated with the MAC entity). For example, in some implementations, the $D_i$ may be set to a first value (e.g., "1") to indicate that the PDCP duplication function for the DRB i (or SRB i) is to be activated. Conversely, in some such implementations, the $D_i$ may be set to a second value (e.g., "0") to indicate that the PDCP duplication function for the DRB i (or SRB i) is to be deactivated.

In one implementation, the DRB ID may range from 4 to 32, where the IDs 1, 2 and 3 may be preserved for the SRB 1, SRB 2 and SRB 3, respectively. In such a case, the DRB ID and the SRB ID may share the same (RB) ID pool. In another implementation, if the SRB 1/SRB 2/SRB 3 doesn't support the PDCP duplication function (e.g., due to a default configuration, the RRC signaling, or another Duplication Activation/Deactivation MAC CE for the SRB), the DRB ID in the Duplication Activation/Deactivation MAC CE may range from 1 to 32. In such a case, the DRB ID and the SRB ID may use independent ID pools.

Although in FIG. 1 the Duplication Activation/Deactivation MAC CE 100 includes a single octet containing eight D-fields (e.g., $D_0$ to $D_7$) to indicate the PDCP duplication function status (e.g., the activation state or the deactivation state) of at most eight DRBs, the length of the Duplication Activation/Deactivation MAC CE may be different in other implementations. For example, in some of the present implementations, the length of the Duplication Activation/Deactivation MAC CE may depend on one or more pre-defined rules and/or configurations. For example, the Duplication Activation/Deactivation MAC CE may include two octets containing sixteen D-fields to indicate the PDCP duplication function status of at most sixteen DRBs in some implementations. In some other implementations, the Duplication Activation/Deactivation MAC CE may include three octets containing 24 D-fields to indicate the PDCP duplication function status of at most 24 DRBs. In yet some other implementations, the Duplication Activation/Deactivation MAC CE may include four octets containing 32 D-fields to indicate the PDCP duplication function status of at most 32 DRBs.

Each of the Duplication Activation/Deactivation MAC CEs containing different number of octets may be identified by a MAC PDU subheader with a specific LCID value. In one implementation, the Duplication Activation/Deactivation MAC CEs containing different number of octets may be identified by different MAC PDU subheaders with different LCID values. In another implementation, the Duplication Activation/Deactivation MAC CEs containing different number of octets may be identified by a MAC PDU subheader with the same LCID value, and the UE may determine the size of the received Duplication Activation/Deactivation MAC CE based on the PDCP duplication configurations for the respective DRBs. For example, a Duplication Activation/Deactivation MAC CE including only one octet of D-fields and a Duplication Activation/Deactivation MAC CE including two octets of D-fields may correspond to the same (or different) LCID value.

In one implementation, the UE may determine the size of the received Duplication Activation/Deactivation MAC CE based on the PDCP duplication configurations for the respective DRBs (e.g., the number of the DRBs configured with the PDCP duplication function). For example, when there are three DRBs configured with the PDCP duplication function, the UE may determine the size of the received Duplication Activation/Deactivation MAC CE to be one octet. Similarly, when there are twelve DRBs configured with the PDCP duplication function, the UE may determine the size of the received Duplication Activation/Deactivation MAC CE to be two octets.

In one implementation, a DRB configured with the PDCP duplication function may map to an Unacknowledgement (UM) mode or an Acknowledgement (AM) mode.

In an E-UTRA-NR Dual Connectivity (EN-DC) case, if the master node (e.g., the LTE eNB) configured with a master node-terminated split bearer (which may use the radio sources of both the master node and the secondary node (e.g., the NR gNB) for the UL and Downlink (DL) transmissions) is further configured with the PDCP duplication function, the PDCP duplication function status (e.g., activation/deactivation) of the PDCP duplication function may not be controlled by the master node itself, but may be controlled by the secondary node (e.g., the NR gNB) via the duplication control information (e.g., the Duplication Activation/Deactivation MAC CE). For the UL transmission, the UE may activate/deactivate the PDCP duplication function of a configured radio bearer (e.g., a DRB) in response to the duplication control information. However, the receiving side (e.g. at the master node) may encounter an excessive delay for reordering the PDCP PDUs in the buffer. For example, the master node's PDCP entity may not know whether the PDCP duplication function configured for the radio bearer is activated or not. In such a case, for a radio bearer configured with the UM or AM mode, the PDCP entity may wait for the missing PDCP PDU(s) from the additional RLC entity, if the PDCP entity believes that the PDCP duplication function is still working. Therefore, if the PDCP entity can be aware of the activation/deactivation of the PDCP duplication function, the PDCP entity may determine that the PDCP PDU(s) may be lost based on a shorter reordering time.

Accordingly, some implementations of the present disclosure may provide duplication status reporting mechanisms for a wireless communication system in which the NW may know from which PDCP PDU the PDCP duplication function is activated or deactivated (e.g., by checking the duplication status report), so that contradictory decision or redundant NW control may be avoided.

UE Response for Duplication Control Information

According to some implementations of the present disclosure, once the UE receives the duplication control information (e.g., a Duplication Activation/Deactivation MAC CE) from a first NW node, the UE may send a duplication status report to a second NW node to report the change of the PDCP duplication function status of the radio bearer(s) affected by the duplication control information. For example, for the EN-DC case, when the UE's MAC entity receives a Duplication Activation/Deactivation MAC CE from the secondary node indicating to activate the PDCP duplication function of the DRB associated with $D_3$ and to deactivate the PDCP duplication function of the DRB associated with $D_5$, the UE may send a duplication status report to the master node to report the change of the PDCP duplication function status of the affected DRBs (e.g., the DRBs associated with $D_3$ and $D_5$).

In some implementations, the duplication status report may not be limited to be reported to the NW node that does not transmit the duplication control information. The UE may report the duplication status report to the first NW node and/or second NW node once the duplication control information is received from the first NW node or from the second NW node. For example, the duplication status report may be sent to the master node, the secondary node, or both, based on one or more pre-defined rules, configurations, and/or triggering conditions (e.g., the radio bearer is configured for the CA duplication and the duplication status report may only need to be send to the related NW node for the radio bearer). For example, the duplication status report may be sent to the master node in a case that the master node-terminated split bearer is configured in the current deployment, or may be sent to both of the master node and the secondary node in a case that the UE does not know the location of the affected PDCP entity configured with the PDCP duplication function.

In one implementation, the duplication status report may include at least one of the following items: 1) at least one duplication status indicator associated with at least one radio bearer, and 2) at least one Last Sequence Number (LSN) indicating a PDCP SN of a last PDCP PDU of the at least one radio bearer before the PDCP duplication function status of the at least one radio bearer is changed in response to the duplication control information.

For example, if the PDCP duplication function of a radio bearer (e.g., a DRB or an SRB) is switched from the deactivation state to the activation state, the last PDCP PDU defined for the LSN may refer to a PDCP PDU with a PDCP header in the PDCP buffer, and may not go through the PDCP duplication operation (or there may be no copy of the PDCP PDU generated in the PDCP buffer). In other words, the last PDCP PDU may be the last PDCP PDU to be sent, without being duplicated, to the RLC layer. In such a case, assuming that the LSN is M, the PDCP PDU with PDCP SN=M+1 may be duplicated. On the other hand, if the PDCP duplication function of a radio bearer is switched from the activation state to the deactivation state, the last PDCP PDU defined for the LSN may refer to a PDCP PDU with a PDCP header in the PDCP buffer, and may go through the PDCP duplication operation (or there may be a copy of the PDCP PDU in the PDCP buffer). In other words, the last PDCP PDU may be the last PDCP PDU to be duplicated and submitted to the multiple associated RLC entities. In such a case, assuming that the LSN is N, the PDCP PDU with PDCP SN=N+1 may not be duplicated.

In accordance with some implementations of the present disclosure, the duplication status report may be included in a MAC CE or a PDCP Control PDU. Details of these two types of duplication status reports are next described in sections A and B.

A. Reporting Duplication Status Report Using PDCP Control PDU

In one implementation, upon receiving the Duplication Activation/Deactivation MAC CE, the MAC entity may notify the PDCP entity of which the PDCP duplication function status of the corresponding radio bearer is affected/changed by the Duplication Activation/Deactivation MAC CE. Then, the affected PDCP entity may send a duplication status report via a PDCP Control PDU.

For example, in FIG. 1 if the PDCP duplication function status of the radio bearer associated with $D_3$ is switched from the deactivation state to the activation state in response to the Duplication Activation/Deactivation MAC CE 100, the PDCP entity for the radio bearer associated with $D_3$ may send a duplication status report (e.g., through a PDCP Control PDU) containing the PDCP SN (LSN) of the last PDCP PDU (which has not been duplicated by the PDCP entity) to the NW.

On the other hand, if the PDCP duplication function status of a radio bearer associated with $D_5$ is switched from the activation state to the deactivation state in response to the Duplication Activation/Deactivation MAC CE 100, the PDCP entity for the radio bearer associated with $D_5$ may send a duplication status report containing the PDCP SN (LSN) of the last PDCP PDU (which has been duplicated by the PDCP entity and submitted to the associated RLC entities) to the NW through a PDCP Control PDU. In one implementation, the length of the PDCP SN for the radio bearers (e.g., UM DRBs or AM DRBs) may be 12 bits or 18 bits.

In one implementation, the PDCP Control PDU containing the duplication status report may include the following fields:

D/C: 1 bit (e.g., setting to "0" for Control PDU or "1" for Data PDU);

PDU type: 3 bits to indicate the PDU type;

R: 1 bit for reserved. The reserved bit may be ignored by the receiver.

LSN (Last Sequence Number): the length of this field is 12 bits when a 12-bit SN length is used or 18 bits when an 18-bit SN length is used.

For example, when the 12-bit SN length is used, the PDCP Control PDU 200 containing the duplication status report is shown in FIG. 2.

The NW PDCP entity may inform the NW MAC entity of the duplication status report reception from the UE side, such that the NW MAC entity may confirm that the previous Duplication Activation/Deactivation MAC CE was successfully received by the UE. Otherwise, the NW MAC entity may try to send the same Duplication Activation/Deactivation MAC CE again, to adjust the content in the new Duplication Activation/Deactivation MAC CE for the UE. In one implementation, the NW MAC entity may try to retransmit the same Duplication Activation/Deactivation MAC CE according to the information received from different NW PDCP entities.

In one implementation, e.g., for the EN-DC case, the master node may not activate or deactivate the PDCP duplication function by itself and may not know the actions (e.g., sending a Duplication Activation/Deactivation MAC CE) taken by the secondary node. When the master node receives the duplication status report, the master node may take certain actions to enhance the reliability of the affected radio bearer(s) (for the case that the associated PDCP function is deactivated).

In some implementations, the master node/secondary node may poll/request the UE to report the duplication status report by setting a P-field in a User Plane PDCP Data PDU. The P-field may refer to a polling indication, which may be configured as, e.g., one bit, to indicate whether the UE is requested to send a PDCP Control PDU for the duplication status report.

For example, when the 12-bit SN length is used, the PDCP Data PDU 300, with reference to FIG. 3, for duplication status report polling may be used.

It should be noted that the number, the position, and/or the length of the respective portions of the fields (e.g., the P-field, the R-field, the PDCP SN-field, and the Message Authentication Code for Integrity (MAC-I) field) in the PDCP Data PDU for duplication status report polling may be various. For example, the position of the P-field may be moved to the position of another R-field, and/or the length of the PDCP SN-field may be 18 bits when the 18-bit SN length is used.

The length of the MAC-I field may be 32 bits in some of the present implementations. The MAC-I field may carry a message authentication code for an integrity check. For SRBs, the MAC-I field may always exist. If the integrity protection is not configured, the MAC-I field may still exist but may be padded with padding bits (e.g., "0"). For DRBs, the MAC-I field may exist only when the DRB is configured with the integrity protection.

In response to the P-field settings in the User Plane PDCP Data PDU (e.g., the PDCP Data PDU 300 shown in FIG. 3) for duplication status report polling, the UE may transmit the corresponding duplication status report with the format as introduced in, e.g., FIG. 2, based on the corresponding PDCP SN length for the PDCP entity.

B. Reporting Duplication Status Report Using MAC CE

As described above, some of the present implementations may report the duplication status report to the NW using a MAC CE. For example, upon receiving the duplication control information (e.g., the Duplication Activation/Deactivation MAC CE) from the NW, the UE's MAC entity may inform the PDCP entity(ies) affected by the duplication control information. The affected PDCP entity(ies) may then send the corresponding LSN to the UE's MAC entity. After receiving the LSN(s) from all of the affected PDCP entity(ies), the UE's MAC entity may transmit a Duplication Status Report MAC CE as the duplication status report back to the NW.

The Duplication Status Report MAC CE may be identified by a MAC PDU subheader with a specific LCID in some of the present implementations. In one implementation, the Duplication Status Report MAC CE may include the following fields:

$S_i$: This field (duplication status indicator) may indicate the PDCP duplication function status of the DRB i (or SRB i), where i is the ascending/descending order of the DRB IDs (or SRB IDs) configured with the PDCP duplication. For example, $S_i$ may be set to a first value (e.g., "1") to indicate that the PDCP duplication status of the DRB i (or SRB i) is changed, or a second value (e.g., "0") to indicate that the PDCP duplication status of the DRB i (or SRB i) is not changed.

$F_i$: This filed may indicate the number of bits of the PDCP SN of the PDCP duplication of the DRB i (or SRB i), where i is the ascending/descending order of the DRB IDs (or SRB IDs) configured with the PDCP duplication. For example, $F_i$ may be set to a first value (e.g., "1") to indicate that the DRB i (or SRB i) is configured with an 18-bit SN length, or a second value (e.g., "0") to indicate that the DRB i (or SRB i) is configured with a 12-bit SN length.

R: Reserved bit (e.g., setting to "0"). In some implementations, the R-field may be removed from the Duplication Status Report MAC CE and may be used as another S-field.

LSN: the length of LSN may be 12 bits when a 12-bit SN length is used, or 18 bits when an 18-bit SN length is used, as described above.

It should be noted that the size/format of the Duplication Status Report MAC CE may be various because the number of the radio bearer(s) affected by the duplication control information and the corresponding PDCP SN length (e.g., 12-bit or 18-bit) may be various. For example, there may be one, two, three, or four octets for the S-fields and/or F-fields in the Duplication Status Report MAC CE. The number of the octet(s) contained in the Duplication Status Report MAC CE may be configured or may be based on one or more pre-defined rules, or based on a fixed number. For example, the UE may determine the number of octet(s) adopted in the Duplication Status Report MAC CE for the S-fields and F-fields based on the number of the radio bearers that are currently configured with the PDCP duplication function. The length of the LSN may also vary depending on the corresponding F-fields.

In one implementation, the NW side may know which radio bearer configured with the PDCP duplication function is affected by the duplication control information based on the S-fields, and may know the corresponding PDCP SN length based on F-fields.

For example, assuming that the total number of the bits for reporting the LSN is N, and the duplication control information (e.g., the Duplication Activation/Deactivation MAC CE) is configured to activate the PDCP duplication function of the radio bearers associated with $D_3$ and $D_4$ and to deactivate the PDCP duplication function of the radio bearers associated with $D_5$, then in the corresponding Duplication Status Report MAC CE, the S-fields associated with the radio bearers indicated by $D_3$, $D_4$, and $D_5$ may be set to "1" and the other S-fields may be set to "0". Furthermore, if the F-fields associated with the radio bearers indicated by $D_3$ and $D_4$ are set to "0", the NW may know that the radio bearers indicated by $D_3$ and $D_4$ are configured with a 12-bit PDCP-SN length. If F-field associated with the radio bearer indicated by $D_5$ is set to "1", the NW may know that the radio bearer indicated by $D_5$ is configured with an 18-bit PDCP SN length. Thus, N is 42.

For all of the different sized Duplication Status Report MAC CEs, N mod 8 may be 0, 2, 4, or 6. For example, a Duplication Status Report MAC CE 400 with N mod 8=0 is shown in FIG. 4. In this example, the S-fields $S_3$, $S_4$, and $S_5$ may be set to "1" and the other S-fields may be set to 0, and the corresponding F-fields, $F_3$, $F_4$ and $F_5$, may be set to "0" (for a 12-bit SN length), "1" (for an 18-bit SN length), and "1" (for an 18-bit SN length), respectively. As another example, a Duplication Status Report MAC CE 500 with N mod 8=6 is shown in FIG. 5. In this example, the S-fields $S_3$ and $S_5$ may be set to "1" and the other S-fields may be set to 0, and the corresponding F-fields $F_3$ and $F_5$ may be set to "0" (for a 12-bit SN length) and "1" (for an 18-bit SN length), respectively.

In some implementations, the Duplication Status Report MAC CE may not include the F-filed(s) and/or the S-field(s). For example, the master node and the secondary node may exchange their duplication bearer information via the X2/Xn/Xx interface (e.g., during the DRB addition procedure or the DRB type change procedure), such that the master node and/or the secondary node may obtain the related duplication radio bearer information (e.g., the SN length and which radio bearer is configured with the PDCP duplication function) in advance.

In one implementation, when the UE's MAC entity receives the duplication control information via the Duplication Activation/Deactivation MAC CE, the UE may respond with a Duplication Status Report MAC CE, as the duplication status report, to the associated NW MAC entity. Once the Duplication Status Report MAC CE is received from the UE, the NW node may pass the information contained in the Duplication Status Report MAC CE to another NW node for reference. For example, when a secondary node sends the Duplication Activation/Deactivation MAC CE to the UE and receives the Duplication Status Report MAC CE from the UE, the secondary node may pass the information contained in the Duplication Status Report MAC CE to the master node for reference. In this example, the master node and the secondary node may exchange the duplication bearer information in advance via the X2/Xn/Xx interface, such that the master node (or the secondary node) may know the related duplication radio bearer information in advance.

In one implementation, when the UE's MAC entity receives a Duplication Activation/Deactivation MAC CE, the UE may respond with a Duplication Status Report MAC CE to the associated NW MAC entity with a format that does not include the S-field(s). After receiving the Duplication Status Report MAC CE from the UE, the NW node may pass the information contained in the Duplication Status Report MAC CE to another NW node for reference. In this example, the NW node sending the Duplication Activation/Deactivation MAC CE knows which radio bearer configured with the PDCP duplication function is affected by the Duplication Activation/Deactivation MAC CE and therefore no S-field may be required.

A MAC PDU may include one or more MAC subPDUs. Each MAC subPDU may include one of the following: 1) a MAC subheader only (including padding), 2) a MAC subheader and a MAC SDU, 3) a MAC subheader and a MAC CE, and 4) a MAC subheader and padding.

The MAC SDUs may have variable sizes. A MAC subheader, except for the fixed sized MAC CE and padding, may include four header fields: R/F/LCID/L. On the other hand, a MAC subheader for the fixed sized MAC CE and padding may include two header fields: R/LCID. The F-field may indicate the length used in the L (Length)-field (e.g., "0" for 8-bit L-field, or "1" for 16-bit L-field). The L-field may indicate the length of the corresponding MAC SDU or the variable-sized MAC CE in bytes.

In some implementations, the master node/secondary node may poll/request the UE to report the Duplication Status Report MAC CE by setting a P-field in the MAC subheader. The P-field may refer to a polling indication, which may be configured as, e.g., one bit, to indicate whether the UE is requested to send the Duplication Status Report MAC CE.

For example, when an 8-bit L-field is used, the MAC subheader 600 with polling is shown in FIG. 6.

Figure 7:
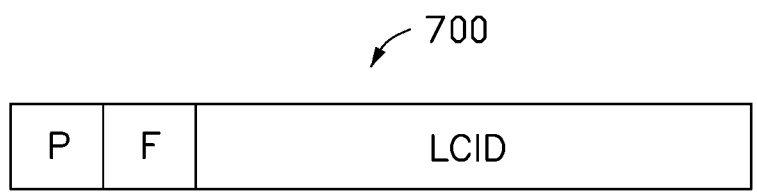
FIG. 7 shows a schematic diagram illustrating a MAC subheader with polling, in accordance with an example implementation of the present disclosure.

For the R/LCID MAC subheader, the MAC subheader 700 with polling is shown in FIG. 7.

It should be noted that the number, the position, and/or the length of the respective portions of the fields (e.g., P/F/LCID/L) in the MAC CE with polling may be various. For example, the MAC subheader may have a 16-bit L-field. In such a case, the MAC subheader may include two octets for the L-field. Furthermore, the location of the P-field may be exchanged with the location of the F-field.

In response to the P-field settings in the MAC subheader for polling the duplication status report, the UE may transmit the Duplication Status Report MAC CE as the duplication status report to the NW. In one implementation, if the P-field is set in the MAC subheader for polling the duplication status report, the corresponding Duplication Status Report MAC CE may include the duplication status report(s) of all the radio bearer(s) (e.g., the DRBs and/or SRBs) configured with the PDCP duplication function. In another implementation, if the P-field is set in the MAC subheader for polling the duplication status report, the corresponding Duplication Status Report MAC CE may include the duplication status report(s) of the radio bearer(s) (e.g., the DRBs and/or SRBs) of which the PDCP duplication function status is just changed (e.g., switched from the activation state to the deactivation state, or switched from the deactivation state to the activation state) within a particular period of time T, where the particular period of time T may be configured by the NW or may be pre-defined.

In one implementation, if the PDCP duplication function status of the respective radio bearers is not changed within the particular period of time T, the UE may not send the Duplication Status Report MAC CE in response to the MAC subheader with polling.

In one implementation, the master node/secondary node may poll/request the UE to send a Duplication Status Report MAC CE by setting the P-filed in a new MAC CE, e.g., a Duplication Status Report Polling MAC CE. The P-filed (polling indication), $P_1$, may be configured to indicate whether the duplication status report for the DRB i (or the SRB i) is needed to be reported or not, where i is the ascending/descending order of the DRB IDs (or SRB IDs) configured with the PDCP duplication function. For example, $P_i$ may be set to "0" to indicate that the duplication status report for the DRB i is not required to be reported, or may be set to "1" to indicate that the duplication status report for the DRB i is required to be reported.

The format of the Duplication Status Report Polling MAC CE may be various because the DRB ID may be in the range from 4 to 32 (since the IDs=1, 2 and 3 may be preserved for the SRB 1, the SRB 2, and the SRB 3, respectively). In another implementation, if SRB 1/SRB 2/SRB 3 doesn't support the PDCP duplication function (by default or configured via RRC signaling or via another Duplication Activation/Deactivation MAC CE for the SRB), the DRB ID in the Duplication Status Report Polling MAC CE may be in the range from 1 to 32.

The length of the Duplication Status Report Polling MAC CE may be various, depending on, e.g., the number of radio bearers (e.g., DRBs or SRBs) configured with the PDCP duplication function. For example, if there are at most eight DRBs (or SRBs) configured with the PDCP duplication function, the corresponding Duplication Status Report Polling MAC CE may include only one octet containing eight P-fields; if there are nine to sixteen DRBs (or SRBs) configured with the PDCP duplication function, the corresponding Duplication Status Report Polling MAC CE may include two octets containing sixteen P-fields, and so on.

In some implementations, the number of octets in the Duplication Status Report Polling MAC CE may be arbitrary. Each type of the Duplication Status Report Polling MAC CE may or may not include R-field(s). For a Duplication Status Report Polling MAC CE that does not include the R-field(s), the Duplication Status Report Polling MAC CE may be used to indicate the corresponding duplication status report for the SRB and/or DRB is included in the corresponding Duplication Status Report MAC CE or not.

In one implementation, different types of the Duplication Status Report Polling MAC CE with different numbers of the P-fields may be identified by different MAC PDU subheaders with different LCID values. In another implementation, different types of the Duplication Status Report Polling MAC CE with different numbers of the P-fields may be identified by a MAC PDU subheader with the same LCID value, and the UE may determine the size of the received Duplication Status Report Polling MAC CE based on the PDCP duplication configuration for the radio bearer(s). For example, if there are three DRBs configured with the PDCP duplication function, the UE may expect the size of the received Duplication Status Report Polling MAC CE to be one octet. As another example, if there are twelve DRBs configured with the PDCP duplication function, the UE may expect the size of the received Duplication Status Report Polling MAC CE to be two octets.

In one implementation, there may be only two types of the Duplication Status Report Polling MAC CE: 1) the Duplication Status Report Polling MAC CE that includes a single octet containing eight P-fields, and 2) the Duplication Status Report Polling MAC CE that includes two octets containing sixteen P-fields. Other combinations of different types of the Duplication Status Report Polling MAC CE may be possible in other implementations, depending on the predefined rules and/or configurations.

In one implementation, after receiving the Duplication Status Report Polling MAC CE, the UE's MAC entity may notify the PDCP entity(ies) associated with the corresponding radio bearer(s) to report the duplication status report. In response to the notification from the MAC entity, the PDCP entity(ies) may inform the MAC entity of the associated duplication status report(s). The MAC entity may then transmit the corresponding Duplication Status Report MAC CE to the NW.

In another implementation, after receiving the Duplication Status Report Polling MAC CE, the UE's MAC entity may notify the PDCP entity(ies) associated with the radio bearer(s) to report the duplication status report. In response to the notification from the MAC entity, the PDCP entity may transmit a PDCP Control PDU including the duplication status report to the NW.

In still another implementation, the UE may periodically transmit the duplication status report to the NW after receiving the duplication control information (e.g., the Duplication Activation/Deactivation MAC CE) from the NW. The periodicity and the related parameter(s) may be provided in the duplication configuration message. For example, based on the configurations, the predefined rules, and/or the duplication control information, the UE may periodically report the duplication status report when the PDCP duplication function is activated, and such periodic reporting mechanism may be stopped when the PDCP duplication function is deactivated.

In some application scenarios (e.g., for the DC duplication case), since the radio channel condition may be dynamically changed and the secondary node may deliver the RLC Service Data Unit (SDU) to the PDCP entity located at the master node via the backhaul, it may be advantageous to reduce/minimize the arrival time difference of the duplicated PDCP PDU(s) between the two NW nodes (e.g., the master node and the secondary node) as much as possible.

Accordingly, some implementations of the present disclosure may provide PDCP duplication transmission adjusting mechanisms for a wireless communication system in which the UE may adjust its UL transmission based on the duplication assistance information received from the NW. For example, for a secondary node-terminated DRB which is configured with the PDCP duplication function being activated, the secondary node may also provide the assistance information to the UE.

Duplication Assistance Information Received From the NW

The duplication assistance information may include at least one of the following items: 1) PDCP SN gap information, and 2) at least one PDCP PDU discard timer configured for at least one RLC entity. The UE may discard one or more PDCP PDUs pending for transmission based on the duplication assistance information, thereby narrowing the difference in transmission progress among a plurality of PDCP duplication transmission paths.

The duplication assistance information may be included in a PDCP Control PDU in some of the present implementations. Details on the types of duplication assistance information are next described.

Transmitting Duplication Assistance Information Using PDCP Control PDU

At the NW side, the PDCP entity configured with the PDCP duplication function being activated may determine that the duplicated PDCP PDU(s) from another NW node (e.g., in a DC duplication case) may be discarded for a while, and the NW side may calculate the PDCP SN gap information accordingly.

In one implementation, the PDCP SN gap information may indicate a (average) difference between a first PDCP SN of a first PDCP PDU received by a first NW node and a second PDCP SN of a second PDCP PDU received by a second NW node. The PDCP SN gap information may be represented by an index (e.g., a PDCP SN gap index) referring to a table including a plurality of values (or ranges), or represented by a single value (e.g., a PDCP SN gap).

For example (e.g., for the DC duplication case), if the PDCP SN of the last received PDCP PDU from the RLC entity (which is located in the same NW node with the PDCP entity) is X, and the PDCP SN of the last received PDCP PDU from another RLC entity is Y, the PDCP SN gap between the two NW nodes may be X-Y (or Y-X), which may be a positive value or a negative value. If the NW node detects that the absolute value of the PDCP SN gap is too large (which makes the PDCP duplication function impractical), for each PDCP entity configured with the PDCP duplication function being activated, the NW node that configures the PDCP duplication function for a radio bearer (e.g., a DRB) may send the duplication assistance information to the associated PDCP entity at the UE side e.g., through a PDCP Control PDU.

As another example (e.g., in a CA duplication case), if the PDCP SN of the last received PDCP PDU from the primary RLC entity is X and the PDCP SN of the last received PDCP PDU from the secondary RLC entity is Y, the PDCP SN gap may be X-Y (or Y-X).

In one implementation, when the UE's PDCP entity receives the duplication assistance information from an NW node (e.g., a master node or a secondary node), the UE may know how the duplication assistance information is calculated based on which node is the terminated node. For example, the UE may implicitly know how the duplication assistance information is calculated based on the transmitting node.

As mentioned above, the duplication assistance information may be represented by an index referring to a table including several values (or ranges), or represented by a single value. For example, when the duplication assistance information is represented by a single value (e.g., the PDCP SN gap), the PDCP Control PDU containing the duplication assistance information may include the following fields:

D/C: 1 bit (e.g., setting to "0" for Control PDU, or setting to "1" for Data PDU);

PDU type: 3 bits to indicate the PDCP type, where the PDU type for a negative PDCP SN gap is different from that for a positive PDCP SN gap;

R: 1 bit for reserved. The reserved bit(s) may be ignored by the receiver;

SNG (PDCP SN gap): the length of this field may be 12 bits when a 12-bit SN length is used to indicate the PDCP SN gap, or 18 bits when an 18-bit SN length is used to indicate the PDCP SN gap.

Figure 8:
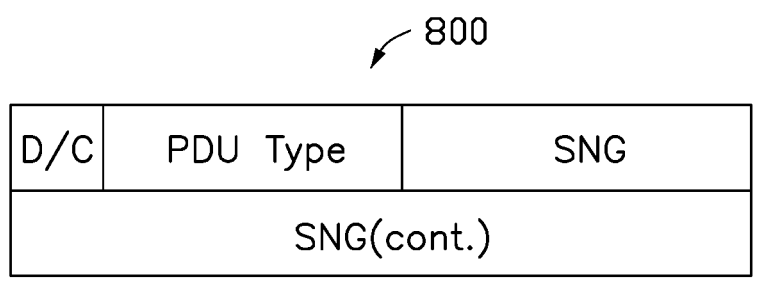
FIG. 8 shows a schematic diagram illustrating a PDCP Control PDU, in accordance with an example implementation of the present disclosure.

For example, when the 12-bit SN length is used, the PDCP Control PDU 800, with reference to FIG. 8, containing the duplication assistance information with the SNG may be used.

In another implementation, when the duplication assistance information is represented by an index (e.g., a PDCP SN gap index), the PDCP Control PDU containing the duplication assistance information may include the following fields:

D/C: 1 bit (e.g., setting to "0" for Control PDU, or setting to "1" for Data PDU);

PDU type: 3 bits to indicate the PDCP type, where the PDU type for a negative PDCP SN gap is different from that for a positive PDCP SN gap;

R: 1 bit for reserved. The reserved bit(s) may be ignored by the receiver;

SNGI (PDCP SN gap index): the length of this field may be 8, 10 or 12 bits, or may be represented by any other bit number. For example, when an 8-bit SNGI length is used, the SNGI may be matched to an SN gap value (or range) by referring to a table containing several values (e.g., from 0 to 255) (or ranges). In one implementation, if the PDCP SN applies a 12-bit SN length, the SNGI may refer to a table defined for a 12-bit SN length. In another implementation, if the PDCP SN applies an 18-bit SN length, the SNGI may refer to a table defined for the 18-bit SN length.

Figure 9:
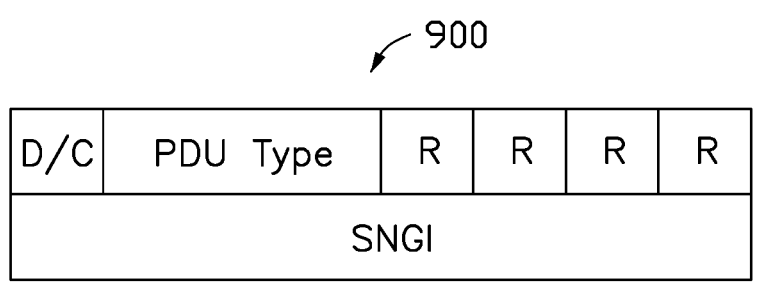
FIG. 9 shows a schematic diagram illustrating a PDCP Control PDU, in accordance with an example implementation of the present disclosure.

For example, when the 8-bit SNGI length is used, the PDCP Control PDU 900, with reference to FIG. 9, containing the duplication assistance information with the SNGI may be used.

As another example, when the 10-bit SNGI length is used, the PDCP Control PDU 1000 containing the duplication assistance information with the SNGI is shown in FIG. 10. In another example, when the 12-bit SN length is used, the SNGI may be set to an index up to 511 (if the SNGI is defined as a 9-bit index), or 1023 (if the SNGI is defined as a 10-bit index), or 2047 (if the SNGI is defined as an 11-bit index).

In still another implementation, the PDCP Control PDU containing the duplication assistance information may further include a specific field (e.g., P/N field) to indicate the plus/minus sign of the SNGI. For example, the PDCP Control PDU may include the following fields:

D/C: 1 bit (e.g., setting to "0" for Control PDU, or setting to "1" for Data PDU);

PDU type: 3 bits to indicate the PDCP type, where the PDU type for a negative PDCP SN gap is the same with that for a positive PDCP SN gap;

P/N: 1 bit to indicate a positive value or a negative value (e.g., "0" for a positive value and "1" for a negative value); and SNGI: the length of this field may be 8, 12 or 18 bits. When an 8-bit SNGI length is used, the SNGI may be matched to an SN gap value (or range) by referring to a table containing a plurality of values (e.g., from 0 to 255) (or ranges). When a 12-bit SN length is used, the SNGI may refer to a table defined for a 12-bit SN length. When an 18-bit SN length is used, the SNGI may refer to a table defined for an 18-bit SN length.

For example, when the 8-bit SNGI length is used, the PDCP Control PDU 1100 containing the duplication assistance information with the P/N field indicating the plus/minus sign of the SNGI is shown in FIG. 11.

In still another implementation, the PDCP Control PDU containing the duplication assistance information may further include a specific field (e.g., P/N field) to indicate the plus/minus sign of the SNG. For example, the PDCP Control PDU may include the following fields:

D/C: 1 bit (e.g., setting to "0" for Control PDU, or setting to "1" for Data PDU);

PDU type: 3 bits to indicate the PDCP type, where the PDU type for a negative PDCP SN gap is the same with that for a positive PDCP SN gap;

P/N: 1 bit to indicate a positive value or a negative value (e.g., "0" for a positive value and "1" for a negative value); and SNG (SN gap): the length of this field may be 12 bits when a 12-bit SN length is used to indicate the PDCP SN gap, or 18 bits when an 18-bit SN length is used to indicate the PDCP SN gap.

For example, when the 12-bit SN length is used, the PDCP Control PDU 1200 containing the duplication assistance information with the P/N field indicating the plus/minus sign of the SNG field is shown in FIG. 12.

As another example, when the 18-bit SN length is used, the PDCP Control PDU 1300 containing the duplication assistance information with the P/N field indicating the plus/minus sign of the SNG field is shown in FIG. 13.

In some implementations, the NW node responsible for the SNG (or SNGI) calculation may be explicitly indicated in the PDCP Control PDU containing the duplication assistance information by a specific field (e.g., T-field) within the PDCP Control PDU. For example, at least one R-field (reserved bit) of the PDCP Control PDU containing the duplication assistance information may be replaced by the T-field. The length of the T-field may be one (or more) bit. For example (e.g., in a DC duplication case), the T-field may be set to "0" to indicate that it is the master node that calculates the PDCP SN gap (e.g., SNG/SNGI), or set to "1" to indicate that it is the secondary that calculates the PDCP SN gap (e.g., SNG/SNGI).

In another implementation, the PDCP Control PDU containing the duplication assistance information may introduce various PDU types to identify the NW node which is in charge of the corresponding PDCP entity for the UE. This may be useful especially in a Multiple Connectivity (MC) scenario (e.g., when at least two NW nodes are involved in the PDCP duplication operation). For example, when the PDU type=100, the NW node that is in charge of the corresponding PDCP entity may refer to a master node; when the PDU type=101, the NW node that is in charge of the corresponding PDCP entity may refer to a first secondary node; when the PDU type=110, the NW node that is in charge of the corresponding PDCP entity may refer to a second secondary node, etc.

When the UE receives a PDCP Control PDU containing the duplication assistance information associated with a PDCP entity having several associated RLC entities and configured with the PDCP duplication being activated, the UE may discard one or more PDCP PDUs that have been already sent to at least one of the RLC entities in order to minimize/reduce the PDCP SN gap.

As mentioned above, the PDCP SN gap information may indicate a (average) difference between a first PDCP SN of a first PDCP PDU received by a first NW node and a second PDCP SN of a second PDCP PDU received by a second NW node. For example, when the PDCP SN gap information indicates that the PDCP SN gap is "−200," it might mean that the UL transmission for the PDCP PDU to the second NW node may be faster than that to the first NW node, and the first PDCP SN of the first PDCP PDU received by the first NW node is "200" behind the second PDCP SN of the second PDCP PDU received by the second NW node. If the first NW node and the second NW node are associated with a first RLC entity and a second RLC entity of the UE, respectively, the UE's PDCP entity may indicate the first RLC entity, which is associated with the first NW node, to discard the first 200 PDCP PDUs in the buffer. It should be noted that the UE may be configured with more than two RLC entities.

In one implementation, the duplication assistance information may include at least one PDCP PDU discard timer configured for at least one RLC entity. When the discard timer configured for an RLC entity expires, the duplicated PDCP PDU submitted to the RLC entity may be discarded (e.g., if the duplicated PDCP PDU has not been transmitted and is still in the buffer). In some implementation, when a duplicated PDCP PDU is submitted to the RLC entity, the associated PDCP PUD discard timer may start.

The PDCP PDU discard timer may be implemented at the PDCP layer or the RLC layer. If the PDCP PDU discard timer is implemented at the PDCP entity, when the PDCP PDU discard timer expires, the PDCP entity may instruct one or more specific RLC entities to discard the duplicated PDCP PDU(s) (if the duplicated PDCP PDU(s) is still queued in the buffer for UL transmissions). Otherwise, the RLC entity may transmit the PDCP PDU(s) based on the scheduling. On the other hand, if the PDCP PDU discard timer is implemented at RLC entity, when the PDCP PDU discard timer of a duplicated PDCP PDU expires, the RLC entity may discard this duplicated PDCP PDU.

Once the RLC entity receives the first or new PDCP PDU discard timer information from the upper layer, the duplicated PDCP PDU that is not delivered to the RLC entity may apply the PDCP PDU discard timer. The value of the PDCP PDU discard timer may be determined based on the received discard timer information (e.g., indicated by a Discard Timer Index or a Discard Timer Value). In one implementation, when the RLC entity receives the first PDCP PDU discard timer information, the RLC entity may discard the duplicated PDCP PDU(s) pending for transmission which is not associated with the PDCP PDU discard timer. It may rely on UE implementation to decide whether to discard the duplicated PDCP PDU(s) that is pending for transmission and is not associated with the PDCP PDU discard timer. On the other hand, when the RLC entity receives the new discard timer information, the RLC entity may discard the duplicated PDCP PDU(s) that is pending for transmission and is not associated with the PDCP PDU discard timer (or associated with the old discard timer). In one implementation, the RLC may discard the duplicated PDCP PDU(s) that is pending for transmission and is not associated with the PDCP PDU discard timer, but may keep the duplicated PDCP PDU(s) that is pending for transmission and is associated with the old PDCP PDU discard timer (e.g., based on the previous received discard timer information). It may rely on UE implementation to decide whether to discard the duplicated PDCP PDU(s) that is pending for transmission and is not associated with the PDCP PDU discard timer and/or the duplicated PDCP PDU(s) that is pending for transmission and is associated with the old discard timer.

In some implementations, the PDCP PDU discard timer may have different values for different radio bearers (e.g., DRBs). In some implementations, the value of the PDCP PDU discard timer may be different when the PDCP duplication function is activated or deactivated for a certain radio bearer. In one implementation, the base station (e.g., gNB)

may configure the PDCP PDU discard timer value via a duplication configuration. Once the PDCP duplication function is activated, the UE may apply the value according to the duplication configuration. Otherwise, the UE may apply the value according to the PDCP/RLC configuration(s). In another implementation, the discard time mechanism may be valid only when the PDCP duplication function is activated. Therefore, the discard time mechanism may be disabled (e.g., the discard time value may be set to infinite) when the duplication is deactivated.

In one implementation, when the PDCP duplication function of a radio bearer (e.g., an SRB or a DRB) is deactivated, only the primary RLC entity (which may be configured by the base station in advance) may be used for the UL transmission. If the PDCP PDU discard timer is implemented at the PDCP entity, the PDCP PDU discard timer may be disabled accordingly. If the PDCP PDU discard timer is implemented in RLC entity, the PDCP PDU discard timer may be disabled for the PDCP PDU that is not delivered to the primary RLC entity. In such a case, the PDCP PDU discard timer for each of the PDCP PDU(s) pending for transmission in the primary RLC entity may be stopped accordingly. In another implementation, the PDCP PDU discard timer for each PDCP PDU pending for transmission in the primary RLC entity may keep running.

If the PDCP PDU discard timer is implemented at a PDCP entity, the value of the PDCP PDU discard timer for each duplicated PDCP PDU of the PDCP entity may be dynamically configured by the PDCP Control PDU containing the duplication assistance information received from the NW. The duplication assistance information may include the configuration of the PDCP PDU discard timer (e.g., the timer values). The dynamic configuration of the PDCP PDU discard timer value may be overwritten by, e.g., RRC signaling.

In one implementation, a PDCP Control PDU containing the duplication assistance information may include the following fields:

D/C: 1 bit (e.g., setting to "0" for Control PDU, or setting to "1" for Data PDU);

PDU type: 3 bits to indicate the PDU type;

DTI (Discard Timer Index): The length of this field may be 4 bits. The DTI field may refer to a table defining the value of the discard timer. In another implementation, the length of the DTI field may not be limited to 4 bits, and may be determined based on a pre-configured or fixed number.

For example, the PDCP Control PDU 1400 containing the duplication assistance information with the DTI field is shown in FIG. 14. When the UE receives the PDCP Control PDU 1400, the UE may apply the PDCP PDU discard timer to all of the associated RLC entities (e.g., two or more RLC entities).

In one implementation, the value of the PDCP PDU discard timer may be represented by a real value (e.g., a Discard Timer Value, DTV) instead of the DTI. The DTV may be 4 bits or 12 bits, or represented by any other bit number. For example, if 4 bits for DTV is used, and the bits include a value of "1011," it shows that the value of the PDCP PDU discard timer is 11 ms.

In another implementation, the PDCP Control PDU containing the duplication assistance information may further include a P/N field, as shown in the following:

D/C: 1 bit (e.g., setting to "0" for Control PDU, or setting to "1" for Data PDU);

PDU type: 3 bits to indicate the PDU type;

P/S: 1 bit (e.g., setting to "0" for the primary RLC entity or setting to "1" for the secondary RLC entity)

DTI (Discard Timer Index): The length of this field may be 3 bits. The DTI field may refer to a table defining the value of the discard timer. In another implementation, the length of the DTI field may not be limited to 3 bits, and may be determined based on a pre-configured or fixed number.

For example, the PDCP Control PDU 1500 containing the duplication assistance information is shown in FIG. 15. When the UE receives the PDCP Control PDU containing the duplication assistance information, the UE may apply the PDCP PDU discard timer to the duplicated PDCP PDU(s) for the associated RLC entity indicated by the P/S field. For example, if the P/S field is set for the primary RLC entity, the duplicated PDCP PDU in the buffer of the primary RLC entity may be discarded when the associated PDCP PDU discard timer expires and/or the duplicated PDCP PDU is still in the buffer of the primary RLC entity.

In another implementation, the DTI field in the PDCP Control PDU 1500 may be replaced by the DTV field. The length of the DTV field may be 3 bits or 11 bits or other number of bits. For example, if 3 bits for the DTV is used, then the value "011" in the bits may mean that the value of the PDCP PDU discard timer is 3 ms.

In another implementation, the PDU Type field of the PDCP Control PDU containing the duplication assistance information may indicate the PDCP PDU discard timer is for the primary RLC entity or the secondary RLC entity. In such a case, the PDCP Control PDU containing the duplication assistance information may not have the P/S field, and the DTI/DTV field may have a 4-bit length or any other pre-configured or fixed length.

When the PDCP PDU discard timer is implemented at RLC entity, the value of the PDCP PDU discard timer for each duplicated PDCP PDU of the associated RLC entity may be configured based on the PDCP Control PDU containing the duplication assistance information. The duplication assistance information may include the value of the PDCP PDU discard timer for configuration.

For example, in FIG. 14, when the PDCP Control PDU 1400 containing the duplication assistance information is received, the PDCP entity may forward the DTI (or the DTV) of the PDCP PDU discard timer to all of the associated RLC entities. The associated RLC entities may apply the PDCP PDU discard timer for each duplicated PDCP PDU received from the PDCP entity.

As another example, in FIG. 15, when the P/S field of the PDCP Control PDU 1500 containing the duplication assistance information is set for the primary RLC entity, the PDCP entity may inform the primary RLC entity of the PDCP PDU discard timer value, and the primary RLC entity may discard the duplicated PDCP PDU when the associated PDCP PDU discard timer expires.

As still another implementation, if the PDCP Control PDU 1500 does not include the P/S field and the PDU type is set for the primary RLC entity, the PDCP entity may inform the primary RLC entity of the PDCP PDU discard timer value, and the primary RLC entity may discard the duplicated PDCP PDU when the associated PDCP PDU discard timer expires. For example, the UE may first receives a PDCP Control PDU that contains the duplication assistance information indicating that the PDCP PDU discard timer is for primary RLC entity. If the UE then receives another PDCP Control PDU indicating that the PDCP PDU discard timer is for the secondary RLC entity, the primary RLC entity and the secondary RLC entity may perform the following operations in some of the implementations:

Operation 1-1

In operation 1-1, the primary RLC entity may stop the associated PDCP PDU discard timer for each duplicated PDCP PDU pending for transmission, and any duplicated PDCP PDU newly received from the upper layer may not be associated with a PDCP PDU discard timer. On the contrary, for the secondary RLC entity, any duplicated PDCP PDU newly received from the upper layer may be associated with a PDCP PDU discard timer (e.g., based on the newly received discard timer information).

Operation 1-2

In operation 1-2, the primary RLC entity may stop the associated PDCP PDU discard timer for each duplicated PDCP PDU pending for transmission, and any duplicated PDCP PDU newly received from the upper layer may not be associated with a PDCP PDU discard timer. On the contrary, for the secondary RLC entity, any duplicated PDCP PDU newly received from the upper layer and any received duplicated PDCP PDU pending for transmission may be associated with a PDCP PDU discard timer (e.g., based on the new received discard timer information).

Operation 1-3

In operation 1-3, the primary RLC entity may stop the associated PDCP PDU discard timer for each duplicated PDCP PDU pending for transmission, and any duplicated PDCP PDU newly received from the upper layer may not be associated with a PDCP PDU discard timer. On the contrary, for the secondary RLC entity, the duplicated PDCP PDU newly received from the upper layer may be associated with a PDCP PDU discard timer (e.g., based on the new received discard timer information), and the received duplicated PDCP PDU pending for transmission may be discarded.

Operation 2-1

In operation 2-1, the primary RLC entity may keep running the associated PDCP PDU discard timer for each duplicated PDCP PDU pending for transmission, while any duplicated PDCP PDU newly received from the upper layer may not be associated with a PDCP PDU discard timer. On the contrary, for the secondary RLC entity, any newly received duplicated PDCP PDU from the upper layer may be associated with a PDCP PDU discard timer (e.g., based on the new received discard timer information).

In operation 2-2, the primary RLC entity may keep running the associated PDCP PDU discard timer for each duplicated PDCP PDU pending for transmission, and any duplicated PDCP PDU newly received from the upper layer may not be associated with a PDCP PDU discard timer. On the contrary, for the secondary RLC entity, the newly received duplicated PDCP PDU from the upper layer and the received duplicated PDCP PDU pending for transmission may be associated with a PDCP PDU discard timer (e.g., based on the new received PDCP PDU discard timer information).

In operation 2-3, the primary RLC entity may keep running the associated PDCP PDU discard timer for each duplicated PDCP PDU pending for transmission, and any newly received duplicate PDCP PDU from the upper layer may not be associated with a PDCP PDU discard timer. On the contrary, for the secondary RLC entity, the duplicated PDCP PDU newly received from the upper layer may be associated with a PDCP PDU discard timer (e.g., based on the new received PDCP PDU discard timer information), and the received duplicated PDCP PDU pending for transmission may be discarded.

It should be noted that the base station (e.g., the gNB) may provide information field(s) while configuring the PDCP PDU discard timer. According to the setting of the information field(s), the UE may know whether to associate the PDCP PDU timer with the new received duplicated PDCP PDU, or whether to stop associating the PDCP PDU discard timer with the duplicated PDCP PDU pending for transmission, or whether not to associate the PDCP PDU discard timer with the newly received duplicated PDCP PDU (e.g., using the information field(s) to indicate the above mentioned operations applied (e.g., operations 1-1, 1-2, 1-3, 2-1, 2-2, and 2-3). The applicable implementation (s) to be used may be predefined and/or configured.

Similar behaviors for the alternative implementations may be adopted in some implementations. For example, the UE may first receive a PDCP Control PDU containing the duplication assistance information which indicates the PDCP PDU discard timer for the secondary RLC entity. The UE may then receive another PDCP Control PDU containing the duplication assistance information which indicates the PDCP PDU discard timer for the primary RLC entity.

When the UE receives a PDCP Control PDU containing the duplication assistance information associated with a PDCP entity configured with the PDCP duplication function being activated, the UE's PDCP entity may notify one of several RLC entities (e.g., two or more RLC entities) to accelerate the transmission of the duplicated PDCP PDU(s) already sent to the RLC entity to reduce/minimize the PDCP SN gap for the receiving side. The RLC entity, that receives the notification and/or the PDCP SN gap information, may prioritize the related duplicated PDCP PDU(s) for transmission to reduce/minimize the PDCP SN gap for the receiving side. In one implementation, the UE may further determine an appropriate value for the PDCP PDU discard timer for a PDCP PDU (if the NW does not explicitly configure the value of the PDCP PDU discard timer). In another implementation, when the UE receives a PDCP Control PDU containing the duplication assistance information associated with a PDCP entity configured with the PDCP duplication function being activated, the UE's PDCP entity may notify one of the RLC entities to discard certain duplicated PDCP PDU(s) in the buffer of the RLC entity in response to the duplication assistance information from the NW.

In some implementations, it may be up to UE's implementation to determine how to use the duplication assistance information to reduce/minimize the PDCP SN gap for the receiving side.

Figure 16:
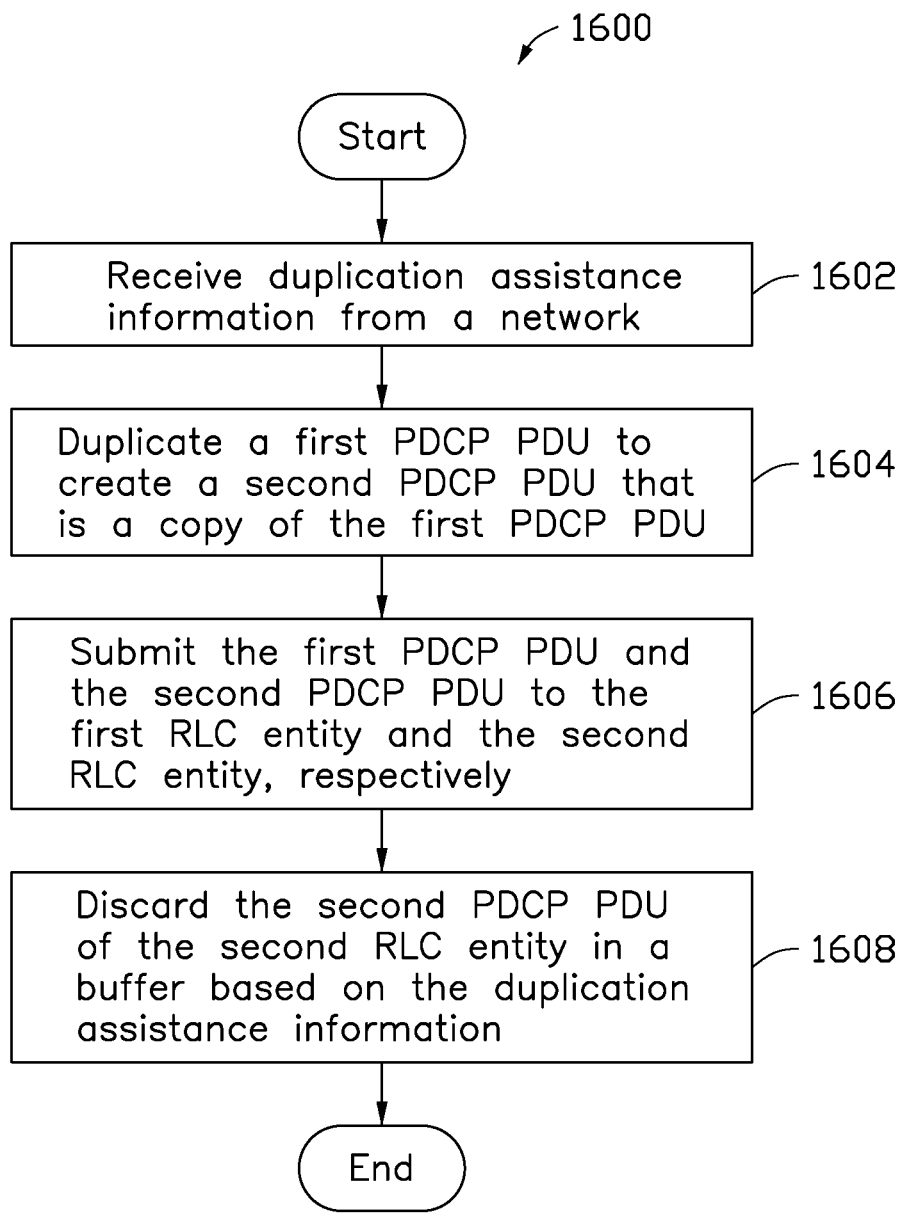
FIG. 16 is a flowchart of a method for PDCP duplication operations, in accordance with example implementations of the present disclosure.

FIG. 16 is a flowchart for a method of PDCP duplication operations, in accordance with example implementations of the present disclosure. As shown in FIG. 16, the flowchart 1600 includes actions 1602, 1604, 1606 and 1608.

In action 1602, a communication device (e.g., an UE), which is configured with a plurality of RLC entities (e.g., two or more RLC entities) including a first RLC entity and a second RLC entity, may receive the duplication assistance information from an NW. In one implementation, the duplication assistance information may include at least one of: a PDCP SN gap, and a PDCP PDU discard timer configured for the second RLC entity.

In action 1604, the communication device may duplicate a first PDCP PDU to create a second PDCP PDU that is a copy of the first PDCP PDU.

In action 1606, the communication device may submit the first PDCP PDU and the second PDCP PDU to the first RLC entity and the second RLC entity, respectively.

In action 1608, the communication device may discard the second PDCP PDU of the second RLC entity in a buffer (e.g., an RLC buffer or a PDCP buffer) based on the duplication assistance information. For example, when the duplication assistance information includes a PDCP SN gap indicating that the SN of the PDCP PDU received by the second NW node falls behind the SN of the PDCP PDU received by the first NW node, the communication device may discard the PDCP PDU (the second PDCP PDU) pending for transmission to accelerate the transmission progress for the second RLC entity. As another example, the duplication assistance information may at least include a PDCP PDU discard timer configured for the second RLC entity. The communication device may discard the second PDCP PDU(s) pending for transmission when the PDCP PDU discard timer expires.

Figure 17:
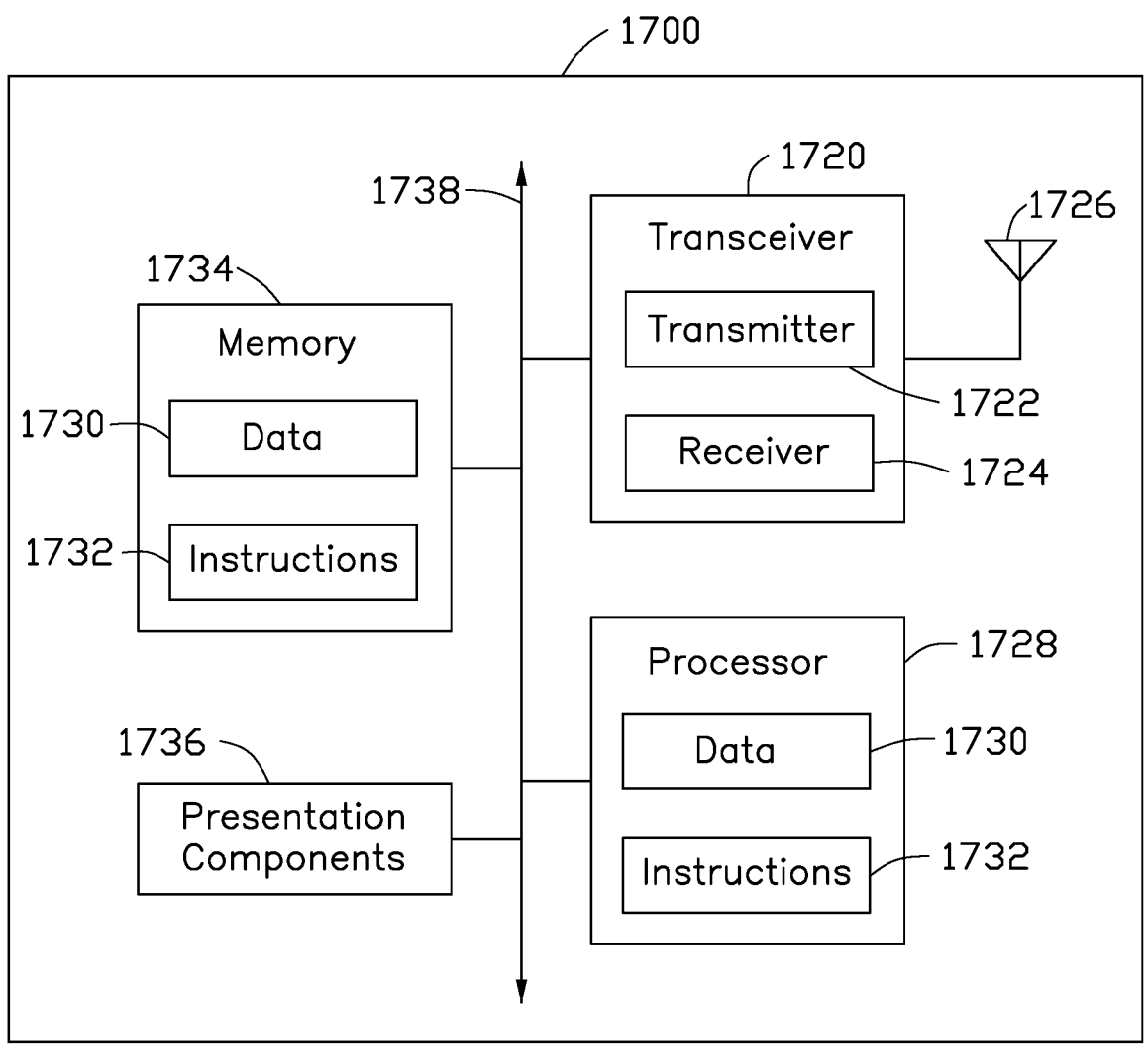
FIG. 17 illustrates a block diagram of a node for wireless communication, in accordance with various aspects of the present application.

FIG. 17 illustrates a block diagram of a node for wireless communication, in accordance with various aspects of the present application. As shown in FIG. 17, a node 1700 may include a transceiver 1720, a processor 1728, a memory 1734, one or more presentation components 1736, and at least one antenna 1726. The node 1700 may also include an RF spectrum band module, a base station communications module, a network communications module, and a system communications management module, input/output (I/O) ports, I/O components, and power supply (not explicitly shown in FIG. 17). Each of these components may be in communication with each other, directly or indirectly, over one or more buses 1738. In one implementation, the node 1700 may be a UE, a base station, or any communication device that performs various functions described herein, for example, with reference to FIGS. 1 through 16.

The transceiver 1720 having a transmitter 1722 (e.g., transmitting/transmission circuitry) and a receiver 1724 (e.g., receiving/reception circuitry) may be configured to transmit and/or receive time and/or frequency resource partitioning information. In some implementations, the transceiver 1720 may be configured to transmit in different types of subframes and slots including, but not limited to, usable, non-usable and flexibly usable subframes and slot formats. The transceiver 1720 may be configured to receive data and control channels.

The node 1700 may include a variety of computer-readable media. Computer-readable media can be any available media that can be accessed by the node 1700 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1734 may include computer-storage media in the form of volatile and/or non-volatile memory. The memory 1734 may be removable, non-removable, or a combination thereof. Exemplary memory includes solid-state memory, hard drives, optical-disc drives, and etc. As illustrated in FIG. 17, The memory 1734 may store computer-readable, computer-executable instructions 1732 (e.g., software codes) that are configured to, when executed, cause the processor 1728 to perform various functions described herein, for example, with reference to FIGS. 1 through 16. Alternatively, the instructions 1732 may not be directly executable by the processor 1728 but be configured to cause the node 1700 (e.g., when compiled and executed) to perform various functions described herein.

The processor 1728 (e.g., having processing circuitry) may include an intelligent hardware device, e.g., a central processing unit (CPU), a microcontroller, an ASIC, and etc. The processor 1728 may include memory. The processor 1728 may process the data 1730 and the instructions 1732 received from the memory 1734, and information through the transceiver 1720, the base band communications module, and/or the network communications module. The processor 1728 may also process information to be sent to the transceiver 1720 for transmission through the antenna 1726, to the network communications module for transmission to a core network.

One or more presentation components 1736 presents data indications to a person or other device. Exemplary presentation components 1736 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for wireless communications, the method comprising:

receiving, by a communication device, duplication assistance information from a network, the communication device being configured with a Packet Data Convergence Protocol (PDCP) duplication function and a plurality of Radio Link Control (RLC) entities including a first RLC entity and a second RLC entity;

duplicating, by a PDCP entity of the communication device, a first PDCP Protocol Data Unit (PDU) to create a second PDCP PDU that is a copy of the first PDCP PDU;

providing, by the PDCP entity of the communication device, the first PDCP PDU and the second PDCP PDU to the first RLC entity and the second RLC entity, respectively;

discarding, by the communication device, the second PDCP PDU in a buffer of the second RLC entity based on the duplication assistance information when the PDCP duplication function is activated; and minimizing, by the PDCP entity of the communication device, a PDCP Sequence Number (SN) gap between the first RLC entity and the second RLC entity.

2. The method of claim 1, wherein the duplication assistance information comprises a PDCP PDU discard timer configured for the second RLC entity.

3. The method of claim 1, wherein the duplication assistance information comprises PDCP SN gap information that indicates a difference between a first PDCP SN of a first PDCP PDU received by a first network node in the network and a second PDCP SN of a second PDCP PDU received by a second network node in the network.

4. The method of claim 2, further comprising:
discarding, by the communication device, the second PDCP PDU when the PDCP PDU discard timer expires.

5. The method of claim 1, wherein the duplication assistance information is included in a PDCP control PDU.

6. The method of claim 1, further comprising:
receiving, by the communication device, duplication control information from the network, the duplication control information being configured to switch a status of the PDCP duplication function of at least one radio bearer; and
transmitting, by the communication device, a duplication status report to the network.

7. The method of claim 6, wherein the duplication status report comprises at least one Last Sequence Number (LSN) indicating a PDCP SN of a last PDCP PDU of the at least one radio bearer before the status of the PDCP duplication function is switched in response to the duplication control information.

8. The method of claim 6, wherein the duplication status report is included in a PDCP control PDU or a Medium Access Control (MAC) Control Element (CE).

9. The method of claim 6, wherein the duplication status report is transmitted in response to a change of the status of the PDCP duplication function.

10. A communication device configured with a Packet Data Convergence Protocol (PDCP) duplication function and a plurality of Radio Link Control (RLC) entities including a first RLC entity and a second RLC entity, the communication device comprising:
one or more non-transitory computer-readable media having computer-executable instructions embodied thereon; and
at least one processor coupled to the one or more non-transitory computer-readable media, and configured to execute the computer-executable instructions to:
receive duplication assistance information from a network;
duplicate a first PDCP Protocol Data Unit (PDU) to create a second PDCP PDU that is a copy of the first PDCP PDU;
provide the first PDCP PDU and the second PDCP PDU to the first RLC entity and the second RLC entity, respectively;
discard the second PDCP PDU in a buffer of the second RLC entity based on the duplication assistance information when the PDCP duplication function is activated; and
minimize a PDCP Sequence Number (SN) gap between the first RLC entity and the second RLC entity.

11. The communication device of claim 10, wherein the duplication assistance information comprises a PDCP PDU discard timer configured for the second RLC entity.

12. The communication device of claim 10, wherein the duplication assistance information comprises PDCP Sequence Number (SN) SN gap information that indicates a difference between a first PDCP SN of a first PDCP PDU received by a first network node in the network and a second PDCP SN of a second PDCP PDU received by a second network node in the network.

13. The communication device of claim 11, wherein the at least one processor is further configured to execute the computer-executable instructions to:
discard the second PDCP PDU when the PDCP PDU discard timer expires.

14. The communication device of claim 10, wherein the duplication assistance information is included in a PDCP control PDU.

15. The communication device of claim 10, wherein the at least one processor is further configured to execute the computer-executable instructions to:
receive duplication control information from the network, the duplication control information being configured to switch a status of the PDCP duplication function of at least one radio bearer; and
transmit a duplication status report to the network.

16. The communication device of claim 15, wherein the duplication status report comprises at least one Last Sequence Number (LSN) indicating a PDCP SN of a last PDCP PDU of the at least one radio bearer before the status of the PDCP duplication function is switched in response to the duplication control information.

17. The communication device of claim 15, wherein the duplication status report is included in a PDCP control PDU or a Medium Access Control (MAC) Control Element (CE).

18. The communication device of claim 15, wherein the duplication status report is transmitted in response to a change of the status of the PDCP duplication function.

* * * * *